(12) United States Patent
Kim

(10) Patent No.: US 7,967,726 B2
(45) Date of Patent: Jun. 28, 2011

(54) METHOD AND AN APPARATUS FOR CONTROLLING SHIFTING OF AN AUTOMATIC TRANSMISSION

(75) Inventor: Hoegab Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 722 days.

(21) Appl. No.: 11/954,939

(22) Filed: Dec. 12, 2007

(65) Prior Publication Data

US 2009/0105044 A1 Apr. 23, 2009

(30) Foreign Application Priority Data

Oct. 19, 2007 (KR) .................. 10-2007-0105554

(51) Int. Cl.
| | |
|---|---|
| *B60W 10/04* | (2006.01) |
| *B60W 10/10* | (2006.01) |
| *F16H 61/00* | (2006.01) |
| *G06F 7/00* | (2006.01) |
| *G06F 17/00* | (2006.01) |

(52) U.S. Cl. .......... 477/118; 477/107; 477/110; 701/54; 701/55; 701/65

(58) Field of Classification Search .................. 477/118, 477/34, 52–54, 68, 107, 110; 701/54–56, 701/65, 70
See application file for complete search history.

(56) References Cited

U.S. PATENT DOCUMENTS

| | | | | |
|---|---|---|---|---|
| 5,626,536 A | * | 5/1997 | Kono et al. .................. | 477/181 |
| 5,813,942 A | * | 9/1998 | Nakagawa et al. ........... | 477/120 |
| 5,816,979 A | * | 10/1998 | Shiiba et al. ................. | 477/176 |
| 5,928,111 A | * | 7/1999 | Sakakibara et al. .......... | 477/181 |
| 6,773,372 B2 | * | 8/2004 | Matsubara et al. ............. | 477/78 |

FOREIGN PATENT DOCUMENTS

| | | | |
|---|---|---|---|
| JP | 07103329 A | * | 4/1995 |
| JP | 9-105459 A | | 4/1997 |
| JP | 2005-9510 A | | 1/2005 |
| KR | 1020050060912 A | | 6/2005 |
| KR | 10-0569077 B1 | | 4/2006 |

* cited by examiner

*Primary Examiner* — Tisha D Lewis

(74) *Attorney, Agent, or Firm* — Morgan, Lewis & Bockius LLP

(57) ABSTRACT

A method of controlling an automatic transmission includes determining whether a coast-down control condition is met, and performing coast-down control if the condition is met. The coast-down control includes selectively downshifting, such that engine speed is maintained above a fuel-cut threshold speed. The coast-down control condition may include a throttle opening being below a threshold opening, a shift-speed being higher than or equal to a threshold shift-speed, and a road slope being smaller than a predetermined slope. The method may also include determining whether a deceleration lock-up control condition is met, and performing deceleration lock-up control, including engaging a lock-up clutch, if the condition is met. The deceleration lock-up control condition may include a throttle opening being below a threshold opening, a shift-speed being below a threshold shift-speed, a brake not being operated, and a difference between an engine speed and a turbine speed being smaller than a reference value.

4 Claims, 5 Drawing Sheets

METHOD AND AN APPARATUS FOR CONTROLLING SHIFTING OF AN AUTOMATIC TRANSMISSION

CROSS-REFERENCE TO RELATED APPLICATION

This application claims priority to, and the benefit of, Korean Patent Application No. 10-2007-0105554, filed in the Korean Intellectual Property Office on Oct. 19, 2007, the entire contents of which are incorporated herein by reference.

BACKGROUND OF THE INVENTION (a) Field of the Invention

The present invention relates to a method and an apparatus for controlling shifting of an automatic transmission.

(b) Description of the Related Art

A typical automatic transmission includes a shift control apparatus that controls hydraulic pressure of solenoid valves, depending on various vehicle running states, such as vehicle speed and throttle valve opening, to shift gears.

The automatic transmission also includes a number of friction members. In each shifting operation, an off-going element is released, and an on-coming element is engaged. The operation of the off-going and on-coming elements is controlled by hydraulic pressure supplied thereto.

Deceleration lock-up control is sometimes employed in such a transmission. During deceleration lock-up control, a lock-up clutch is engaged at certain conditions. By such a lock-up clutch operation, a fuel-cut region of an engine is increased.

During coasting (i.e. a driver taking his foot off the accelerator pedal such that the vehicle nuns by its momentum), an engine control unit starts a fuel-cut control, and accordingly, engine speed decreases.

When the engine speed is decreased to a predetermined threshold speed, the engine control unit stops the fuel-cut control and restarts fuel supply to the engine such that the engine may produce power. Even if the engine power is not required, the engine is operated with the supply of fuel, which results in deterioration of fuel consumption.

In order to improve the fuel consumption, a deceleration lock-up control is employed in controlling the automatic transmission.

The lock-up clutch is controlled on and off even if shifting is not involved, and this repeated engagement and disengagement of the lock-up clutch may deteriorate the durability.

In addition, when a brake is operated while the lock-up clutch is engaged, the lock-up clutch is released in order to prevent engine stall and to improve noise-vibration-harshness (NVH) characteristics. This also reduces the fuel-cut region, and deteriorates the fuel consumption.

The above information disclosed in this Background section is only for enhancement of understanding of the background of the invention and therefore it may contain information that does not form the prior art that is already known in this country to a person of ordinary skill in the art.

SUMMARY OF THE INVENTION

A method of controlling shifting of an automatic transmission includes determining whether a coast-down control condition is met, and performing coast-down control if the coast-down control condition is met. The coast-down control includes selectively downshifting, such that an engine speed is maintained above a fuel-cut threshold speed.

The coast-down control condition may include a current throttle opening being below a threshold opening, a current shift-speed being higher than or equal to a threshold shift-speed, and a road slope being smaller than a predetermined slope.

The method may also include determining whether a deceleration lock-up control condition is met, and performing a deceleration lock-up control if the deceleration lock-up control condition is met. The deceleration lock-up control may include engaging a lock-up clutch.

The deceleration lock-up control condition may include a current throttle opening being below a threshold opening, a current shift-speed being below a threshold shift-speed, a brake not being operated, and a difference between an engine speed and a turbine speed being smaller than a reference value.

DETAILED DESCRIPTION OF PREFERRED EMBODIMENTS

In the following detailed description, only certain exemplary embodiments of the present invention are shown and described for illustrative purposes.

Figure 1:
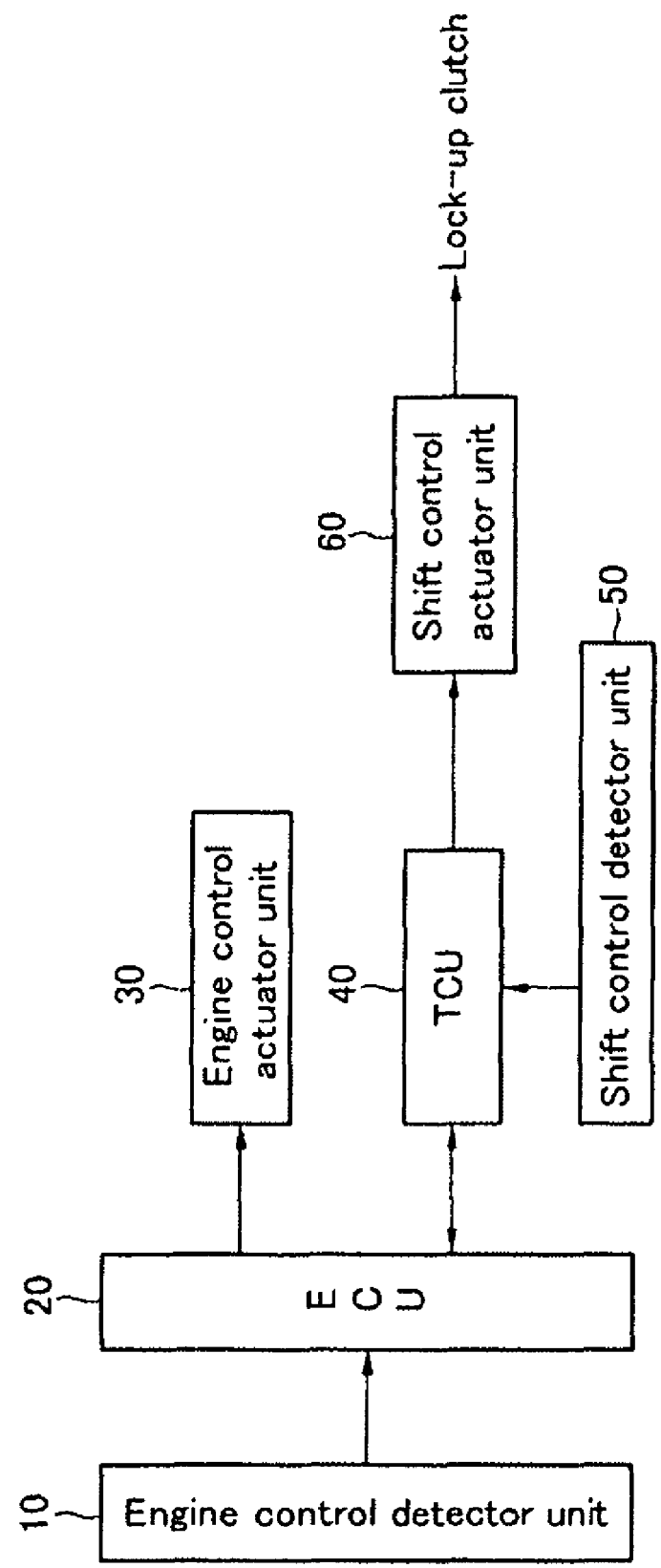
FIG. 1 is a block diagram of an apparatus for controlling shifting of an automatic transmission according to an exemplary embodiment of the present invention.

As shown in FIG. 1, an apparatus for controlling shifting of an automatic transmission includes an engine control detector unit 10, an engine control unit (ECU) 20, an engine control actuator unit 30, a transmission control unit (TCU) 40, a shift control detector unit 50, and a shift control actuator unit 60.

The engine control detector unit 10 includes a plurality of sensors such as an accelerator pedal sensor, a throttle position sensor, a turbine speed sensor, a vehicle speed sensor, a crank angle sensor, an engine speed sensor, a coolant temperature sensor, and a brake sensor. The engine control detector unit 10 detects data for engine control, and provides the data to the ECU 20.

The ECU 20 controls the engine by controlling the engine control actuator unit 30 based on the data received from the engine control detector unit 10.

In addition, the ECU 20 provides fuel-cut information for deceleration lock-up control and coast-down control, and brake operation information to the TCU 40.

The TCU 40 controls shifting of the transmission, deceleration lock-up control, and coast-down control, based on the data received from the ECU 20 and the shift control detector unit 50.

The shift control detector unit 50 includes a plurality of sensors that provides data required for shifting operation of the automatic transmission, such as a vehicle speed sensor, a fluid temperature sensor, an inhibitor switch, and a brake switch.

The shift control actuator unit 60 includes a plurality of actuators that control supply of hydraulic pressure to the lock-up clutch and the friction members of the automatic transmission. The shift control actuator unit 60 is controlled by signals from the TCU 40, and it enables engagement of an on-coming friction member and disengagement of off-going friction member such that a threshold shift-speed is attained. Also, the shift control actuator unit 60 controls the lock-up control and the coast-down control, based on signals from the TCU 40.

The ECU 20 and the TCU 40 communicate with each other, such as through a CAN network or a serial network.

Figure 3:
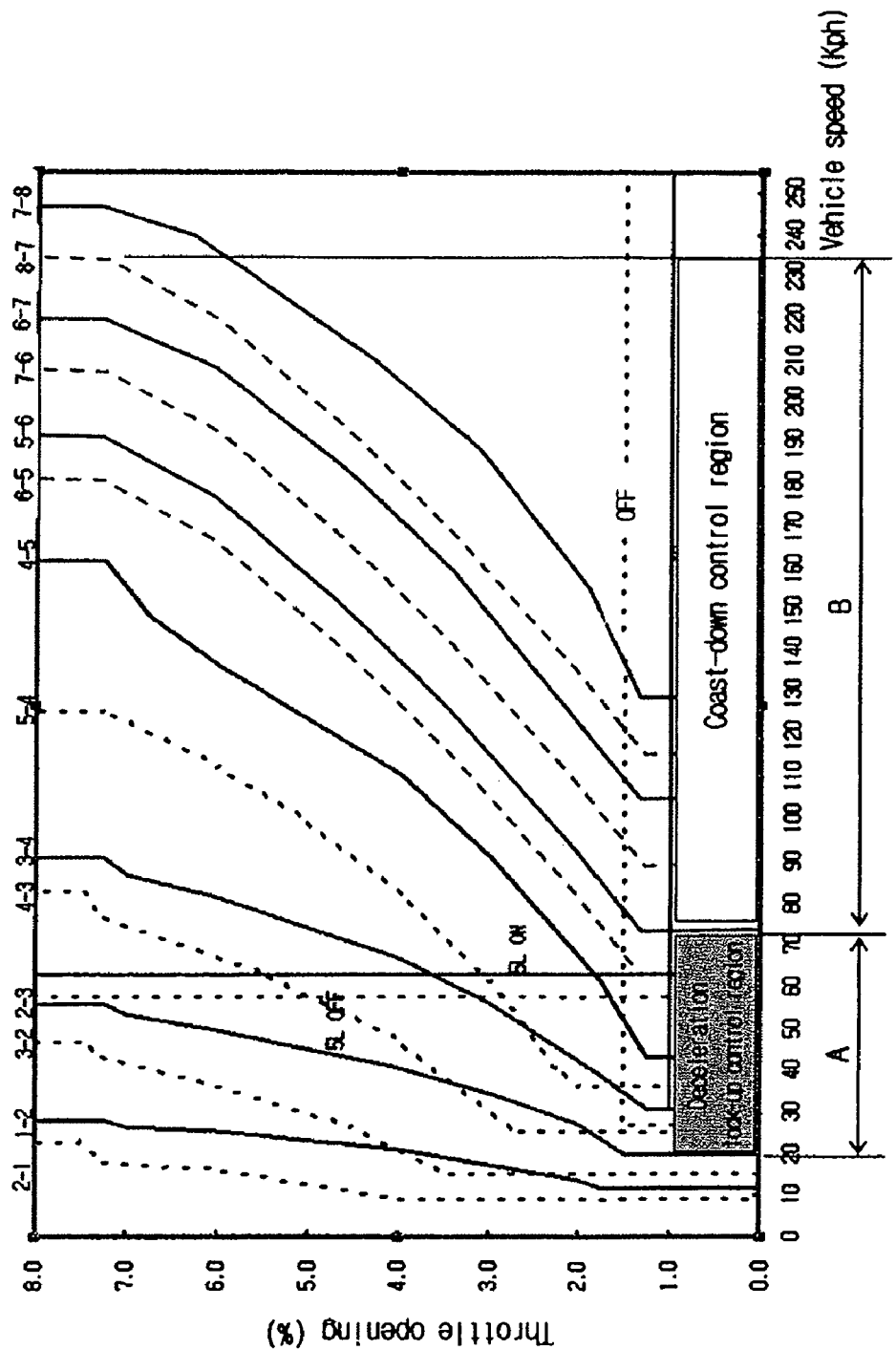
FIG. 3 shows shift pattern of an automatic transmission according to an exemplary embodiment of the present invention.

Referring to FIG. 3, a fuel-cut region includes a deceleration lock-up control region A where the fuel-cut control is performed by known methods, and a coast-down control region B where the fuel-cut control is performed by involving a down-shifting operation.

That is, in a high gear and at a high vehicle speed, the TCU 40 enables the fuel-cut by the coast-down control, which is later described in detail, such that fuel-cut is maintained as long as possible.

Figure 2:
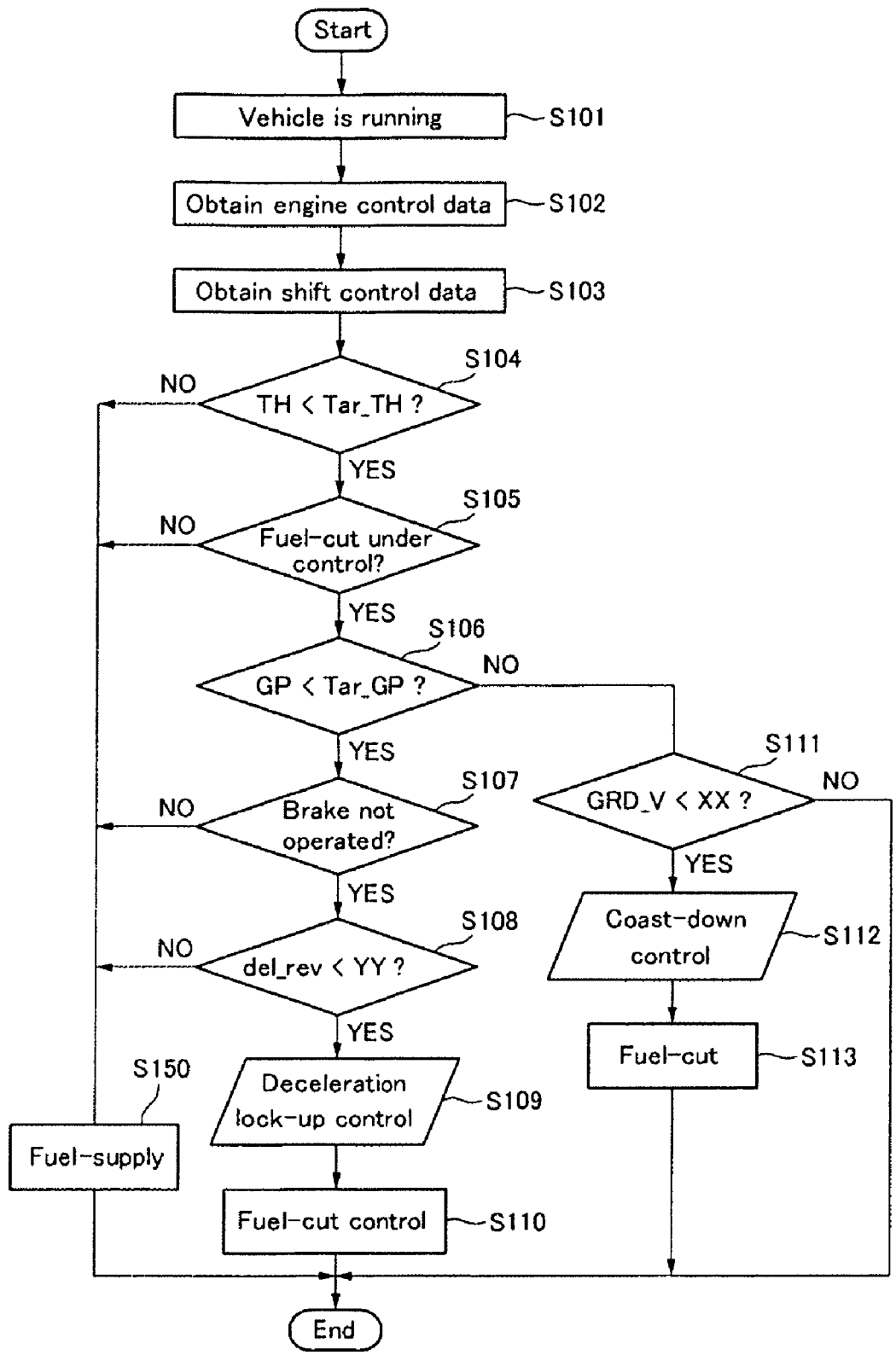
FIG. 2 is a flowchart of a method for controlling shifting of an automatic transmission according to an exemplary embodiment of the present invention.

The control scheme according to an exemplary embodiment of the present invention is hereinafter described with reference to FIG. 2 and FIG. 3.

While the vehicle is driven at step S101, the ECU 20 receives the engine control data from the engine control detector unit 10, and controls the engine by controlling the engine control actuator unit 30 based on the engine control data.

At step S102, the ECU 20 provides engine control data to the TCU 40. The engine control data include, for example, throttle opening, fuel-cut information (i.e., whether the fuel-cut of the engine is currently performed), engine speed, and brake operation information (i.e., whether the brake of the vehicle is operated).

At step S103, the TCU 40 obtains shift control data including, for example, a current shift-speed and a current turbine speed, from the shift control detector unit 50.

Subsequently, at step S104, the TCU 40 determines whether the throttle opening is below a threshold opening Tar_TH, e.g., a value of ⅛ of the full open amount.

When the throttle opening is below the threshold opening Tar_TH, the TCU 40 determines at step S105 whether the fuel-cut control is currently performed.

If the fuel-cut control is currently performed, the TCU 40 determines at step S106 whether a current shift-speed GP is below a threshold shift-speed Tar_GP (e.g., $6^{th}$ speed).

If the current shift-speed GP is below the threshold shift-speed Tar_GP, the TCU 40 determines at step S107 whether the brake of the vehicle is operated.

If the brake is not operated, the TCU determines at step S108 whether a difference del_rev of the engine speed Ne and the turbine speed Nt is smaller than a predetermined reference value YY.

If the difference is smaller than the predetermined reference value, the TCU 40 performs deceleration lock-up control by controlling the shift control actuator unit 60 at step S109. During the deceleration lock-up control, the lock-up clutch is engaged. At step S109, if the lock-up clutch is already engaged, the TCU 40 maintains the engaged state of the lock-up clutch.

Since the TCU 40 performs the deceleration lock-up control at step S109, the ECU 20 may maintain the fuel-cut control at step S110.

If the throttle opening TH is above the threshold opening Tar_TH at step S104, if the fuel-cut control is not currently performed at step S105, if the brake is operated at step S107, or if the difference del_rev is above the predetermined reference value YY at step S108, the fuel-cut control is released by the ECU 20 at step S150. Therefore, the deceleration lock-up control is performed only if all the deceleration lock-up control conditions are met.

If the current shift-speed GP is higher than or equal to the threshold shift-speed Tar_GP at step S106, the TCU 40 determines at step S111 whether a current road slope GRD_V is smaller than a predetermined reference value XX. If the road slope is not smaller than the predetermined reference value XX, conventional control of the lock-up clutch is performed. If the road slope is smaller than the predetermined reference value XX, coast-down control is performed at step S112. The coast-down control is later described in detail. Since the TCU 40 performs the coast-down control at step S111, the ECU 20 may maintain the fuel-cut control at step S113. Therefore, the coast-down control is performed only if all the coast-down control conditions are met.

It should be noted that the coast-down control conditions do not necessarily include the brake not being operated; and the difference of the engine speed and the turbine speed being smaller than the reference value.

Figure 4:
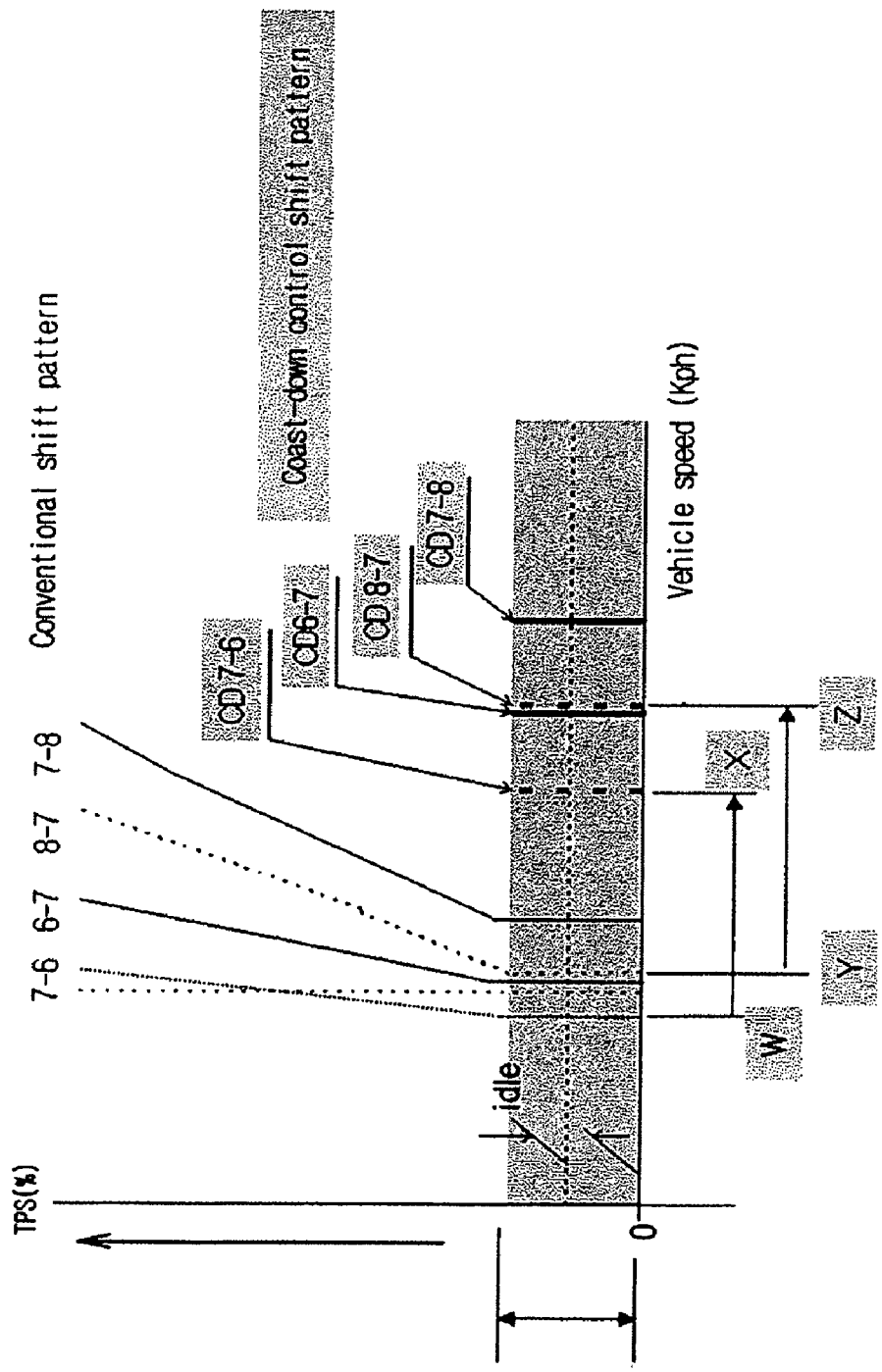
FIG. 4 shows an enlarged shift pattern that shows coast-down control region according to an exemplary embodiment of the present invention.

FIG. 4 shows an enlarged shift pattern that shows coast-down control region according to an exemplary embodiment of the present invention.

In the coast-down control region of the shift pattern of FIG. 3, if the threshold shift-speed Tar_GP is $6^{th}$ speed, a 7→6 shifting point is X, and an 8→7 shifting point is Z, in comparison with a conventional shift pattern in which a 7→6 shifting point is W, and an 8→7 shifting point is Y. Therefore, in the coast-down control region, downshifting is performed at higher speeds than in the conventional shift pattern, which allows the engine speed to remain higher than a threshold engine speed.

Therefore, if the vehicle speed decreases to the level at which the engine speed is close to the fuel-cut threshold speed, the TCU 40 forces downshifting of the transmission, such that the engine speed is increased. Such an operation maintains the engine speed above the fuel-cut threshold speed, and thus, the fuel-cut control is maintained until the engine speed drops to the fuel-cut threshold speed when the current shift-speed has dropped below the threshold shift-speed Tar_GP.

Therefore, while the vehicle speed is decreasing, the fuel-cut control may be performed for a long duration, during which no fuel is used, thereby improving fuel efficiency of the vehicle.

Figure 5:
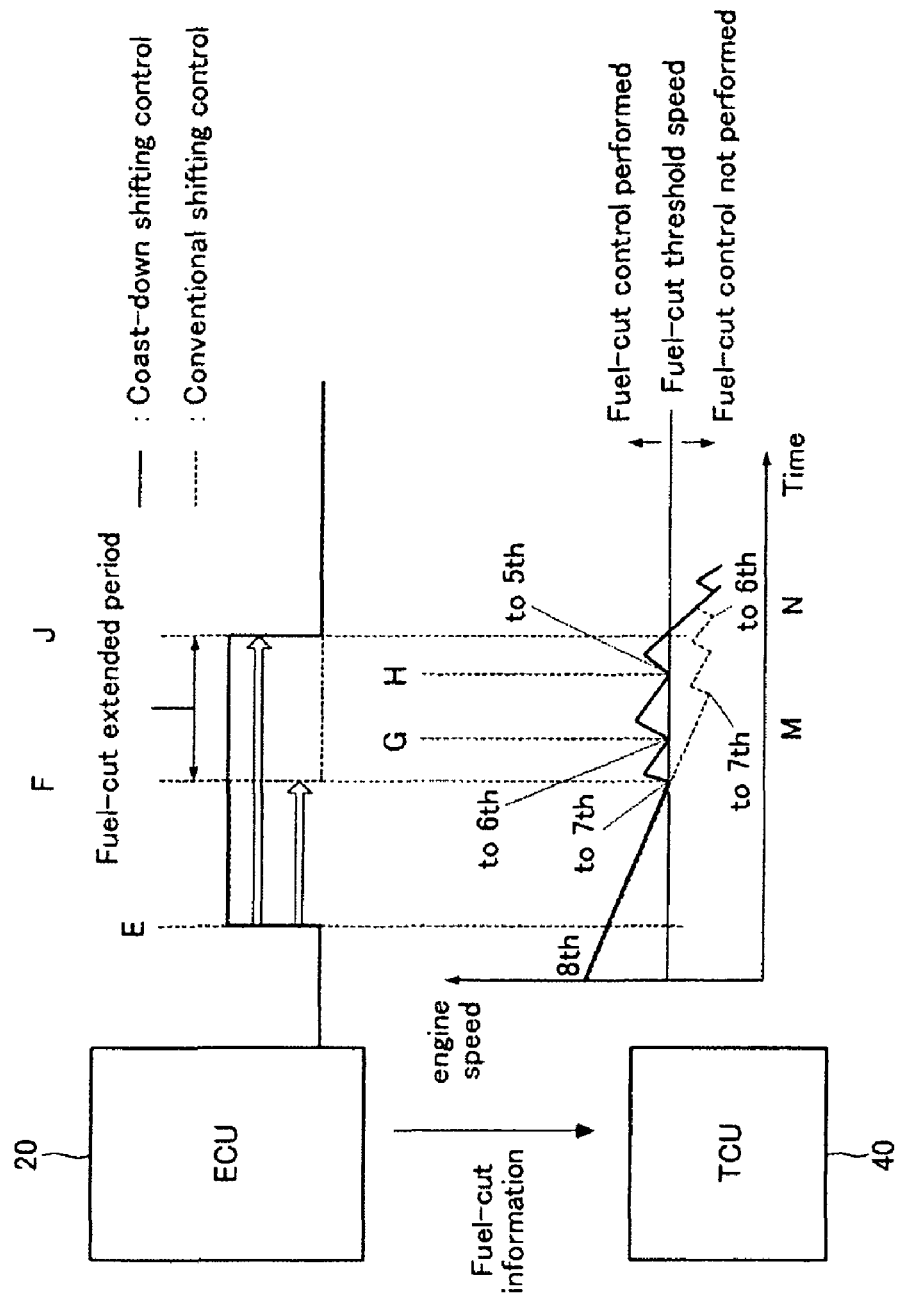
FIG. 5 illustrates the coast-down control of an automatic transmission according to an exemplary embodiment of the present invention.

The downshifting operation of the coast-down control is hereinafter described in further detail with reference to FIG. 5.

When the coast-down control conditions are met, the TCU 40 performs the coast-down control. Then, when the engine speed decreases to the fuel-cut threshold speed, the TCU 40 forces downshifting. That is, at a time F where the vehicle speed is the fuel-cut threshold speed while the vehicle is running in $8^{th}$ speed, the TCU forces downshifting of the transmission to $7^{th}$ speed. Therefore, the engine speed is increased far above the fuel-cut threshold speed, and the fuel-cut control is maintained. In the conventional method, however, the 8→7 downshifting is performed at time M, when the fuel-cut control has already been stopped.

When the engine speed decreases again to the fuel-cut threshold speed, the TCU 40 forces another downshifting. That is, at a time G where the vehicle speed reaches the fuel-cut threshold speed while the vehicle is running at the 7$^{th}$ speed, the TCU forces another downshifting of the transmission to the 6$^{th}$ speed. Therefore, the same as the above, the engine speed is increased again far from the fuel-cut threshold speed. At a time H, a 6→5 downshifting occurs in the same way, and the engine speed remains above the fuel-cut threshold speed.

Now, only when the vehicle speed is further decreased while the transmission is in its 5$^{th}$ speed, the engine speed drops below the fuel-cut threshold speed at time J and the fuel-cut control is stopped.

As described above, according to the coast-down control of an exemplary embodiment of the present invention, the fuel-cut control may be maintained longer when the vehicle is decelerating. Therefore, fuel efficiency is increased, and durability of the lock-up clutch is enhanced since the lock-up clutch is engaged and disengaged less frequently.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of controlling shifting of an automatic transmission, comprising:
   performing a fuel-cut control;
   determining whether a current shift-speed is below a threshold shift speed when the fuel-cut control is performed, to selectively perform a deceleration lock-up control or a coast-down control;
   determining whether a coast-down control condition in the coast-down control is met when the current shift-speed is equal to or above the threshold shift speed; and
   performing the coast-down control if the coast-down control condition is met, the coast-down control comprising selectively downshifting such that an engine speed is maintained above a fuel-cut threshold speed.

2. The method of claim 1, wherein the coast-down control condition comprises:
   a current throttle opening being below a threshold opening;
   the current shift-speed being higher than or equal to the threshold shift-speed; and
   a road slope being smaller than a predetermined slope.

3. The method of claim 1, further comprising:
   determining whether a deceleration lock-up control condition in the deceleration lock-up control is met when the current shift-speed is below the threshold shift speed; and
   performing the deceleration lock-up control if the deceleration lock-up control condition is met, the deceleration lock-up control comprising engaging a lock-up clutch.

4. The method of claim 3, wherein the deceleration lock-up control condition comprises:
   a current throttle opening being below a threshold opening;
   the current shift-speed being below the threshold shift-speed;
   a brake not being operated; and
   a difference between the engine speed and a turbine speed being smaller than a reference value.

* * * * *